June 20, 1961

R. E. FRIEDEN 2,989,645

TRACTOR-TRAILER LIGHTING ADAPTER

Filed April 23, 1958

INVENTOR,
ROBERT E. FRIEDEN.
BY

June 20, 1961 R. E. FRIEDEN 2,989,645
TRACTOR-TRAILER LIGHTING ADAPTER
Filed April 23, 1958 2 Sheets-Sheet 2

INVENTOR,
ROBERT E. FRIEDEN.
BY

United States Patent Office 2,989,645
Patented June 20, 1961

2,989,645
TRACTOR-TRAILER LIGHTING ADAPTER
Robert E. Frieden, Rte. 5, Lincoln, Nebr.
Filed Apr. 23, 1958, Ser. No. 730,302
2 Claims. (Cl. 307—10)

This invention relates to multiple terminal connectors such as used for connecting circuits of a trailer to a towing tractor or truck, and in particular a terminal box divided into two sections by a base by a partition with a plurality of sockets in one section and corresponding plugs or jacks in the other section.

The purpose of this invention is to eliminate the necessity of trying out each individual circuit in connecting the circuits of the tail light, stop and direction signals of a trailer to the switch or terminal box of a tractor to which the trailer is connected.

Various types of connections have been used between tractors and trailers, as tractors are used continuously with different trailers and multiple terminal boxes are not standardized. In connecting tractors to trailers, particularly of different manufacturers, it is necessary, therefore, to try each circuit to determine whether it lights a stop light, direction signal, tail light, or the like, and this requires considerable time. Furthermore, owing to the cost and inconvenience of holding up commercial trailers many trailers start on trips over highways without stop lights or direction signals and lives and property are, therefore, endangered.

With this thought in mind this invention contemplates a terminal housing or box mounted on a cab of a tractor with female sockets in one section and male plugs in a complementary section, and in which the sockets and plugs are marked with indicia to designate to which lights the terminals extend.

The object of this invention is, therefore, to provide multiple terminals for connecting circuits of trailers to corresponding sockets or terminals of a tractor wherein jacks or plugs may readily be inserted in designated sockets so that all circuits between a tractor and a trailer may be connected in a comparatively few minutes.

Another object of the invention is to provide a terminal box for connecting circuits of a trailer to corresponding circuits of a tractor that makes it possible to connect circuits of trailers of different manufacturers to the tractor without changing parts of the connecting elements.

Another important object of the invention is to provide a terminal box for connecting circuits of signals of a trailer to circuits of a tractor in which the terminal box may be installed by the average layman.

A further object of the invention is to provide a terminal box for connecting circuits of signals of a trailer to corresponding circuits of a tractor in which the terminal box is provided with a light to facilitate inserting the correct jacks in the correct sockets.

A still further object of the invention is to provide a terminal box for connecting circuits of lights of a trailer to corresponding circuits of a tractor in which the terminal box is of simple and economical construction.

With these and other objects and advantages in view the invention embodies a housing having a panel therein, a plurality of female sockets in one section of the housing, a plurality of jacks on the ends of cables extended through a wall of one portion, the jacks being positioned to be inserted in sockets of another portion, a light in the housing, and a plurality of wires extended from the sockets and through a cable to signal elements of the trailer.

Other features and advantages of the invention will appear from the following description taken in connection with the drawings, wherein.

Figures 1, 2:
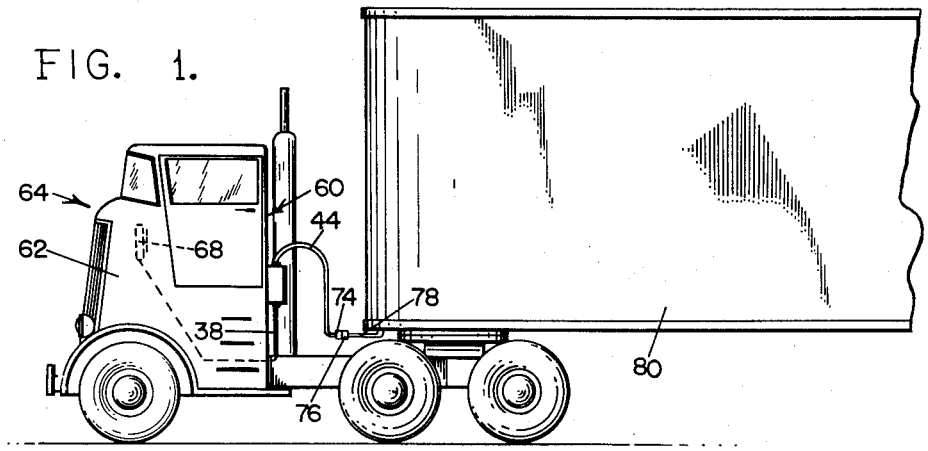
FIGURE 1 is a side elevational view of a tractor trailer combination with the rear portion of the trailer broken away, and showing the terminal box on the back of the cab of the tractor.
FIG. 2 is a plan view of the exposed panel within the housing, with the leads to the jacks shown in full lines and the leads to the jack sockets shown in broken lines behind the panel, and also showing a removable cover in broken lines.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference numerals are used to designate the same parts and elements throughout, and in which the numeral 10 indicates the new device in its entirety, numeral 12 indicating an insulated partitioning panel or partition which divides the terminal box 10 into a rear section 14 and a front section 16, said panel is attached by screws 18 to tabs 20 and 22 extended from side walls 24 and 26 of the terminal box, numerals 28 indicating jack receiving sockets mounted by lock nuts 30 into the panel 12, numerals 32 plugs designed to be inserted into the sockets 28, numerals 34 leads or wires extended from the sockets through a sleeve 36 into a cable 38, numerals 40 leads or wires extended from the plugs 32 through a sleeve 42 into a cable 44 and the numeral 46 a light positioned to illuminate both sections of the interior of the terminal box.

Figure 3:
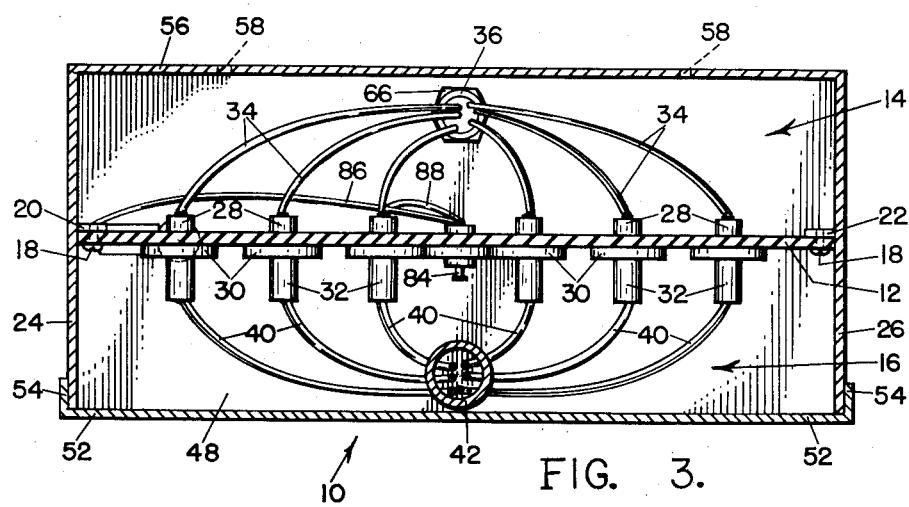
FIG. 3 is a transverse sectional through the upper portion of the terminal box taken substantially on line 3—3 of FIG. 2.
Figure 4:
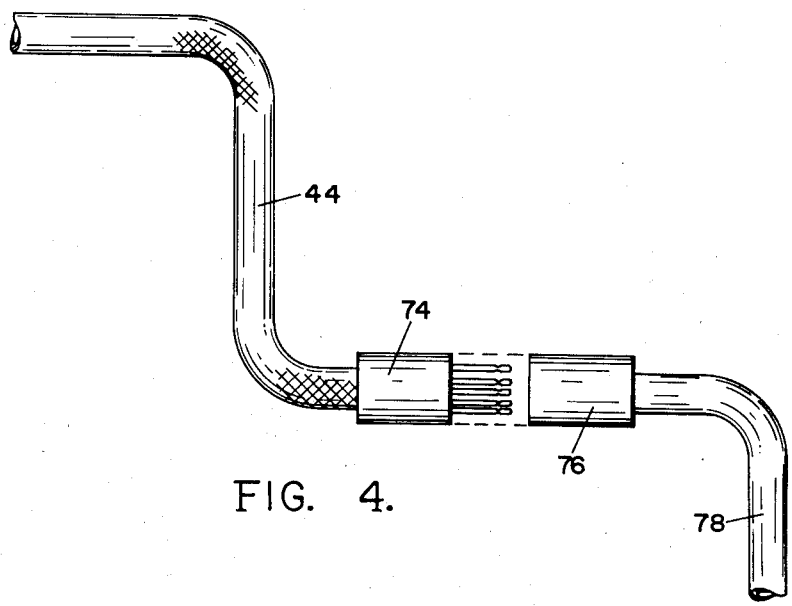
FIG. 4 is a view showing a multiple connection between two parts of a loom or cable such as the loom connecting the terminal box to the trailer in FIGURE 1.

As heretofore mentioned the terminal box is provided with side walls 24 and 26 and is further provided with a base 48, a top wall 50, as shown in FIG. 3. The terminal box is provided with a removable cover 52 having a continual flange 54. A rear wall 56 is provided with apertures 58 for mounting the box in a suitable location on the back 60 of a cab 62 of a tractor 64. The leads 34 are soldered to the sockets 28 in the rear section 14 of the terminal box and extend downward through the sleeve 36 which is secured to the base 48 by lock nuts 66, into a light loom or cable 38 which is in communication with a control switch 68 in the tractor cab 62.

The leads 40 secured to the plugs 32 extend upwardly through the sleeve 42 which is secured to the top side 50 by lock nuts 70, and into the light loom or cable 44 which is provided with a wall socket 74 for connection with a female socket 76. The socket 76 is connected to a further loom or cable 78 and it will be understood that this loom is wired to any desired circuit on a trailer 80 and is standardized with respect to each make.

The sockets 28 are designated by indicia 82, such as "G" indicating a ground, "TM" indicating the trailer markers, "S" indicating a stop light, "LS" indicating a left signal, "RS" indicating a right signal, and "A" indicating accessories.

By this means an operator knows exactly which socket to place the plugs in so thereby eliminating the time consuming process of testing each socket by elimination.

A push pull switch 84 is positioned on the panel 12 in the front section 16 for making and breaking the circuit to the light 46 which is connected by a wire 86 to the switch 84 and a wire 88 connected to one of the sockets 28.

At such times when the tractor trailer combination is of the same make it is only necessary to couple the sockets 74 and 76 to complete the electrical circuit therebetween.

When a trailer of a different make is coupled to the tractor the operator removes the cover plate 52 and makes the necessary connections by inserting the correct plug into the correct socket by visually matching the illuminated lights on the trailer with the correct indicia of a socket. It will be understood that the number of sockets, wires and connections may be in any desired number.

From the foregoing specification it will become apparent that the invention disclosed will adequately accomplish the functions for which it has been designed and in an economical manner and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts such as come within the purview of the invention claimed may be resorted to in actual practice, if desired.

Having now described the invention, that which is claimed to be new and desired to be procured by Letters Patent is:

1. In a tractor-trailer signal circuit connector, the combination which comprises a housing having a partition therein, a plurality of jack receiving sockets mounted in the partition, a loom having leads extended therethrough and said leads being connected to the sockets and extended to an instrument panel in a cab of a tractor, a plurality of jacks in the housing and designed to be inserted in the sockets of the partition, a loom having leads extended therethrough and said leads being connected to the jacks and extended for connections to circuits of a trailer, said housing having a window therein, and a light in the housing and positioned to show through said window.

2. In a terminal box, the combination which comprises a housing having a base section with a partition therein and a cover, a plurality of jack receiving sockets in the partition, a loom having a plurality of leads extended therethrough positioned with the leads at one end connected to said sockets and with the opposite ends of the leads connected to a control panel, a light positioned in the housing and connected in a circuit to one of the sockets, a switch in the circuit to the light, a plurality of jacks in the housing and positioned to be inserted in the sockets, and a loom having a plurality of leads extended therethrough positioned with the leads at one end connected to the jacks and with the opposite ends of the leads extended for connection to independent circuits.

References Cited in the file of this patent

UNITED STATES PATENTS

| | | |
|---|---|---|
| 2,660,679 | Hunt | Nov. 24, 1953 |
| 2,693,539 | Madigan | Nov. 2, 1954 |